United States Patent
Dongell

(10) Patent No.: US 8,317,916 B1
(45) Date of Patent: Nov. 27, 2012

(54) SET RETARDANT FOR HYDRAULIC CEMENT COMPOSITIONS

(75) Inventor: Jonathan E. Dongell, Scottsdale, AZ (US)

(73) Assignee: Pebble Technology, Inc., Scottsdale, AZ (US)

( * ) Notice: Subject to any disclaimer, the term of this patent is extended or adjusted under 35 U.S.C. 154(b) by 153 days.

(21) Appl. No.: 12/878,986

(22) Filed: Sep. 9, 2010

Related U.S. Application Data

(60) Provisional application No. 61/240,960, filed on Sep. 9, 2009.

(51) Int. Cl.
*C04B 16/02* (2006.01)

(52) U.S. Cl. ........ 106/705; 106/716; 106/718; 106/724; 106/726; 106/737; 106/819; 106/823; 106/DIG. 1

(58) Field of Classification Search ............. 106/705, 106/716, 718, 724, 726, 737, 819, 823, DIG. 1
See application file for complete search history.

(56) References Cited

U.S. PATENT DOCUMENTS

| | | | |
|---|---|---|---|
| 3,053,673 A | 9/1962 | Walker | |
| 3,100,526 A | 8/1963 | Martin | |
| 3,234,154 A | 2/1966 | Martin | |
| 3,429,724 A | 2/1969 | Keenum, Jr. et al. | |
| 3,491,049 A | 1/1970 | Gibson et al. | |
| 3,662,830 A | 5/1972 | Martin | |
| 3,953,222 A | 4/1976 | Bainton | |
| 4,131,578 A | 12/1978 | Crinkelmeyer et al. | |
| 4,210,455 A | 7/1980 | Metcalf et al. | |
| 4,256,500 A | 3/1981 | Turpin, Jr. | |
| 4,276,182 A | 6/1981 | Beirute | |
| 4,313,763 A | 2/1982 | Turpin, Jr. | |
| 4,424,074 A | 1/1984 | Villa et al. | |
| 4,654,085 A | 3/1987 | Schinski | |
| 4,939,192 A | 7/1990 | t'Sas | |
| 5,302,200 A | 4/1994 | Smetana et al. | |
| 5,324,469 A | 6/1994 | Walter et al. | |
| 5,346,548 A | 9/1994 | Mehta | |
| 5,391,245 A | 2/1995 | Turner | |
| 5,588,990 A | 12/1996 | Dongell | |
| 6,068,696 A | 5/2000 | Anttila et al. | |
| 6,376,580 B1 | 4/2002 | Ikuta et al. | |
| 6,627,751 B1 | 9/2003 | Batelaan et al. | |
| 6,660,079 B2 | 12/2003 | Jodlbauer et al. | |
| 6,727,315 B2 | 4/2004 | Yamamoto et al. | |
| 6,843,845 B2 | 1/2005 | Sasage et al. | |

*Primary Examiner* — Paul Marcantoni
(74) *Attorney, Agent, or Firm* — Booth Udall, PLC

(57) ABSTRACT

A zinc-oxide based set retardant additive and admixture for use in Portland cement or other hydraulic cement mixtures. The admixture may comprise silica fume, vitreous calcium aluminosilicate, magnesium aluminum silicate hydrate, a cellulose ether derivative, or their equivalents. The zinc-oxide based set retardant may be interground or pre-blended, pre-packaged, or added on the jobsite, as an admixture, additive, or addition. The zinc-based set retardant may be subsequently added or mixed into a ready mix or wet mixture of portland cement or other hydraulic cement, sand and/or aggregate, with or without fillers, and water, with or without other pozzolans or polymers.

17 Claims, 3 Drawing Sheets

Initial Set to Final Set Comparison

| Sample (cement% to sand %) | % zinc oxide as set retardant | Final Set Time from Initial Set |
|---|---|---|
| | | |
| Control Mixture #1 (40% to 60%) | 0% | 2 hr. 45 min. |
| | | |
| Set Retardant Mixture #2 (39.2% to 60%) | 0.8% | 18 hr. 43 min. |
| | | |
| Set Retardant Mixture #3 (39.2% to 60%) | 0.8% | 19 hr. 53 min. |

FIG. 1

| Initial Set to Final Set Comparison | | |
|---|---|---|
| Sample (cement% to sand %) | % zinc oxide as set retardant | Final Set Time from Initial Set |
| | | |
| Control Mixture #1 (40% to 60%) | 0% | 2 hr. 45 min. |
| | | |
| Set Retardant Mixture #2 (39.2% to 60%) | 0.8% | 18 hr. 43 min. |
| | | |
| Set Retardant Mixture #3 (39.2% to 60%) | 0.8% | 19 hr. 53 min. |

FIG. 2

| Initial Set to Final Set Comparison | | |
|---|---|---|
| Sample (cement% to sand %) | % zinc oxide as set retardant | Final Set Time from Initial Set |
| | | |
| Control Mixture #1 (40% to 60%) | 0% | 2 hr. 20 min. |
| | | |
| Set Retardant Mixture (39.6% to 60%) | 0.4% | 12 hr. 50 min. |
| | | |
| Set Retardant Mixture (39.8% to 60%) | 0.2% | 8 hr. 5 min. |
| | | |
| Set Retardant Mixture (39.9% to 60%) | 0.1% | 4 hr. 45 min. |
| | | |
| Set Retardant Mixture (39.95% to 60%) | 0.05% | 3 hr. 10 min. |
| | | |
| Set Retardant Mixture (39.975% to 60%) | 0.025% | 3 hr. 5 min. |

| CH₃ | Methyl |
|---|---|
| CH₂COONa | Sodium carboxymethyl |
| CH₂CH₃ | Ethyl |
| CH₂CH₂OH | Hydroxyethyl |
| CH₂CH(OH)CH₃ | Hydroxypropyl |
| CH₂CH₂CH₂(OH)CH₂ | Hydroxybutyl |

FIG. 5
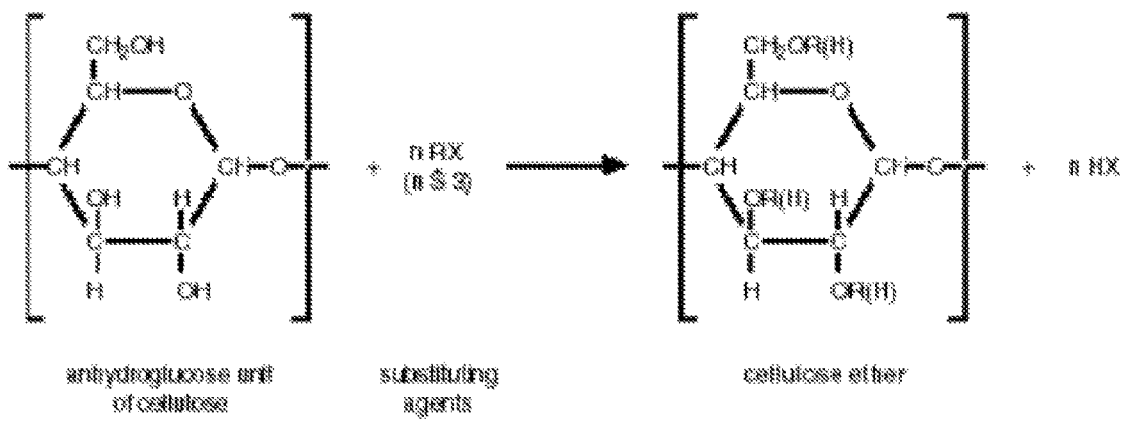
FIG. 6
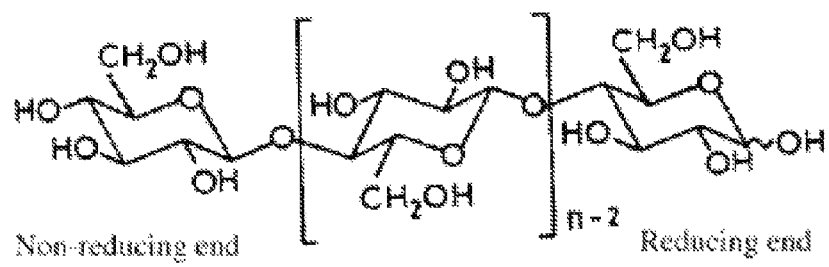
Sometimes shown as
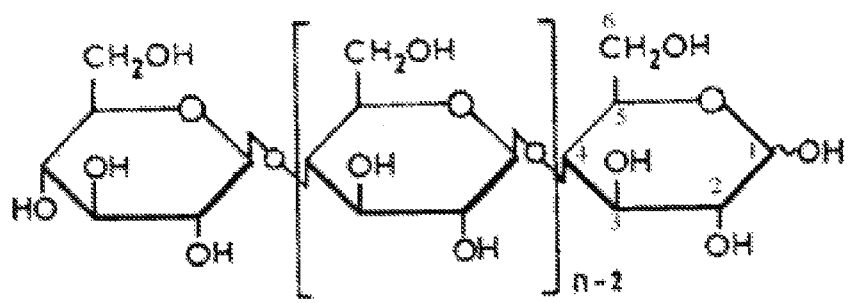
Cellulose

SET RETARDANT FOR HYDRAULIC CEMENT COMPOSITIONS

CROSS REFERENCE TO RELATED APPLICATIONS

This document claims the benefit of the filing date of U.S. Provisional Patent Application No. 61/240,960, entitled "Set Retardant for Hydraulic Cement Compositions" to Jonathan E. Dongell, which was filed on Sep. 9, 2009, the disclosure of which is hereby incorporated entirely by reference herein.

BACKGROUND

1. Technical Field

Aspects of this document relate generally to cementitious products, and more particularly for a matter or composition to control or retard the setting of Portland cement or other hydraulic cement or other materials to make cementitious products.

2. Background

The pouring of cement is a delicate balance between creating an appropriate (i.e. smooth or appropriately textured) top surface for the cement and the dry time for the cement. Generally, it is desirable to extend the dry time for cement without reducing the cement's ability to harden with sufficient strength. Cementitious materials, such as is used for building foundations, roads and sidewalks, are different from mortars, adhesives and binders, such as are used to hold bricks together or tile to a surface, generally as a result of the amount of cementitious material included within the mixture. Because mortars, adhesives and binders are generally applied to stick two things together, the set times for mortars and adhesives are generally much longer than for concrete, gunite, plaster, and the like. The compressive strengths required by mortars, adhesives and binders are generally much lower, and the flexural strengths required are generally much higher, than for concrete, gunite, and plaster. To achieve these requirements, the cementitious materials content of mortars and adhesives are typically much less, and the polymers content are much greater, than for concrete, gunite, and plaster.

Adhesives, binders, and mortars are not within the scope of cement as used herein. These type materials would include thinsets, EIFS (exterior foam insulation systems), or the like, which are polymer-dominated. Such materials are not thought of as hydraulic cement dominated materials, such as; concrete, gunite, or plaster. Rather, these are considered 'adhesive' and 'flexural' materials. Neither can be used in place of the other, as their functions are mutually exclusive. Moreover, adhesives, binders, mortars, and the like, use less hydraulic cement and more polymers, to the point that low amounts of hydraulic cement present in the mix design, behave more as a 'filler' material, and moreover, the adhesive or binding ability of these materials are essentially derived from the over-riding polymer. Whereas, the hydraulic cement of concrete, gunite, plaster, and the like, is the predominant main binder of the end product. Mortars, binders and cementitious material adhesives, as the terms are used herein, typically have a range, by weight, of 8%-24% of cementitious materials whereas cements, as used herein, such as concrete, gunite and plaster, have a range, by weight, of 25%-50% of cementitious materials. As a result, the specific compositions and mixtures for set retardants for concrete, gunite, and plaster products are inherently different and react differently from set retardants used for adhesives, binders and mortars.

Set retardants are sometimes used to extend the time for placement, working, and finishing of cement in certain situations, such as moderate to high-temperature environments, or work of large scope. Set retardants may be used to retard setting time, extend setting time, or delay hydration of the cementitious material. The amount and particular type of set retardant used will vary by the specific cement mixture and quantities being used. Changes in the composition of the mixture of the cement can have greater and lesser affects on the ability of any particular set retardant to work efficiently and permit adequate additional time for working the cement to an appropriate finish. Additional components added to a particular cement mixture can significantly change the ability of particular set retardants to operate as intended.

The Ancient Egyptians and Romans practiced the art of making and using of pozzolan, as a cementitious product. The benefits of using pozzolans can be dated back to a time preceding the Roman Empire. Pozzolans are generally high in siliceous or in siliceous and aluminous materials. Pozzolans were used originally with limestone-type materials, such as slaked lime, together with water to make a type of pozzolan cement. Pozzolans include a wide variety of materials. Some pozzolans are naturally occurring such as, but not limited to certain clays, volcanic ashes, and opaline. Natural pozzolan cements were widely used in the western world and elsewhere until at least the early 1940's when it became evident that the advancing technologies in the manufacture of portland cement offered many advantages over pozzolan cement. A significant drawback to pozzolan cement is that it had relatively slow strength gain and slow setting time. This significantly slowed the pace of construction and inhibited its use in many structural applications. Brick or steel were therefore used for most large structures.

Advancements in the manufacture of portland cement compositions eventually reached a level that allowed the user to achieve increased strength gain and more rapid setting times to become one of the dominant construction materials. Further technological advances in the 1960's to 1980's allowed portland cements to be ground finer and the calcining process to become more refined, which beneficially increased the early strength characteristics of portland cement. More recently, however, pozzolans have been used only as supplementary additives or admixtures to be combined with portland cement and not as the primary binder as in the earlier pozzolan cements.

Certain man-made pozzolans have also been used in combination with portland cement to produce cementitious products. Silica fume, also known as fumed silica or microsilica, fly ash, also known as F ash, C ash or ultra-fine fly ash, or cenospheres, are known pozzolans. The chemical and physical mechanisms by which pozzolans react with cement are understood to be a reaction between the pozzolan and the calcium hydroxide compound of the portland cement, which is compound released during the hydration of the portland cement. Pozzolans are known to have little to no cementing properties of their own. However, when pozzolan reacts with free lime or calcium hydroxide in cement, it forms a calcium silicate, calcium alumina silicate, or such similar compound that is less soluble, less reactive, and therefore less susceptible to most given service environment that the cementitious material might be placed.

Polymers have also been known to be mixed with cementitious materials. In mortars and adhesives, for example, polymers have been known for addition as a primary ingredient as a binder to meet the required characteristic properties of mortars and adhesives.

SUMMARY

Implementations of a set retardant additive for subsequent addition to portland cement or other hydraulic cement, wherein the set retardant additive comprising a plurality of ingredients each having a quantity selected for addition to a known quantity of cement mixture comprising at least cement and sand, the set retardant establishing a set time between initial set to final set of between about two to about five hours, the cement mixture having a total weight calculated after the set retardant additive is added to the cement mixture, the ingredients comprising, a first amount of zinc oxide, the first amount comprising about 0.01% to about 2.0% (w/w) of the total weight, a second amount of one or more pozzolan, the second amount comprising about 5% to about 45% of the total weight, and a third amount of cellulosic polymer, the third amount comprising about 0.01% to about 2% of the total weight.

Particular implementations of the set retardant may comprise one or more of the following: The zinc oxide may comprise a first amount comprising about 0.01% to about 0.25% (w/w) of the total weight. The first amount of zinc oxide may comprise acicular zinc oxide powder. The first amount of zinc oxide may comprise spherical or globular zinc oxide powder. The set retardant additive ingredient quantities may be selected for addition to the known quantity of cement mixture for pouring the cement mixture at a temperature between about 70 degrees F. and about 120 degrees F. The cement mixture may comprise about 40% (w/w) of white cement and about 60% (w/w) of marble sand prior to addition of the set retardant, wherein the first amount of zinc oxide comprises at least 95% of zinc oxide powder smaller than about 325 mesh (45 micron). At least 95% of the zinc oxide may be ground at least to a fineness of at least 200 mesh (75 micron). The zinc oxide may comprise an acicular zinc oxide powder containing at least about 95% of zinc oxide ground sufficiently so that about the powder passes 325 mesh (45 micron). The pozzolan may comprise at least one of silica fume, fly ash, calcined kaolin and vitreous calcium aluminosilicate. The about 5% to about 35% of the total weight comprising the pozzolan may comprise a fourth amount of silica fume, the fourth amount comprising about 0% to about 30% (w/w) of the total weight, a fifth amount of fly ash, the fifth amount comprising about 0% to about 45% (w/w) of the total weight, and a sixth amount of calcined kaolin or vitreous calcium aluminosilicate, the sixth amount comprising about 0% to about 40% (w/w) of the total weight. The fifth amount may comprise about 3 to about 27% (w/w) of fly ash. The fourth amount may comprise about 1% to about 15% (w/w) of silica fume. The sixth amount may comprise about 5% to about 27% (w/w) of calcined kaolin or vitreous calcium aluminosilicate. The cement mixture may be designated for use in one of concrete, gunite and plaster and the additive is adapted for mixture with the cement mixture to be used in concrete, gunite and plaster. The cement mixture may be designated for use in the construction of structures to be exposed to at least one of water, extreme heat and pressure and the additive is adapted for mixture with the cement mixture to be used in the construction of structures to be exposed to at least one of water, extreme heat and pressure. The cement mixture may be designated for use in the construction of bridges, piers, dams, freeways and airport runways and the additive is adapted for mixture with the cement mixture to be used in the construction of bridges, piers, dams, freeways and airport runways. The set time may be selected for between about three to about four hours.

In another aspect, a pre-mixed dry cement mixture may comprise about 50% to about 75% (w/w) of cement, about 10% to about 20% (w/w) of calcined clay, about 5% to about 15% (w/w) of ultra-fine fly ash, about 4% to about 7% (w/w) of fused silica, about 0.01% to about 0.15% (w/w) of zinc-based material, and less than 1% (w/w) hydrooxyethylcellulose. In particular implementations, the mix may be further mixed in a ratio of 1:2:4 of cement:sand:gravel. In other particular implementations, the zinc-based material may comprise zinc oxide.

In yet another aspect, a method of mixing cement for use in poured concrete mixes comprises preparing an additive comprising a plurality of ingredients each having a quantity selected for addition to a known quantity of cement mixture comprising at least cement and sand, the set retardant establishing a set time between initial set to final set of between about two to about five hours, the cement mixture having a total weight calculated after the set retardant additive is added to the cement mixture, the ingredients comprising: a first amount of a zinc-based set retardant, the first amount comprising about 0.01% to about 2.0% (w/w) of the total weight; a second amount of one or more pozzolan, the second amount comprising about 5% to about 45% of the total weight; and a third amount of cellulosic polymer, the third amount comprising about 0% to about 2% of the total weight; and combining the additive with the cement mixture for use as a poured concrete mixture. In a particular implementation, the method further comprising setting the poured concrete mixture with a set time of between about three and about four hours.

Aspects and applications of the disclosure presented here are described below in the drawings and detailed description. Unless specifically noted, it is intended that the words and phrases in the specification and the claims be given their plain, ordinary, and accustomed meaning to those of ordinary skill in the applicable arts. The inventor is fully aware that he can be his own lexicographer if desired. The inventor expressly elects, as his own lexicographer, to use only the plain and ordinary meaning of terms in the specification and claims unless he clearly states otherwise and then further, expressly set forth the "special" definition of that term and explain how it differs from the plain and ordinary meaning Absent such clear statements of intent to apply a "special" definition, it is the inventor's intent and desire that the simple, plain and ordinary meaning to the terms be applied to the interpretation of the specification and claims.

The inventor is also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

Further, the inventor is fully informed of the standards and application of the special provisions of 35 U.S.C. §112, ¶ 6. Thus, the use of the words "function," "means" or "step" in the Description, Drawings or Claims is not intended to somehow indicate a desire to invoke the special provisions of 35 U.S.C. §112, ¶ 6, to define the inventions. To the contrary, if the provisions of 35 U.S.C. §112, ¶ 6 are sought to be invoked to define the inventions, the claims will specifically and expressly state the exact phrases "means for" or "step for, and will also recite the word "function" (i.e., will state "means for performing the function of [insert function]"), without also reciting in such phrases any structure, material or act in support of the function. Thus, even when the claims recite a "means for performing the function of . . . " or "step for performing the function of . . . ," if the claims also recite any structure, material or acts in support of that means or step, or that perform the recited function, then it is the clear intention of the inventors not to invoke the provisions of 35 U.S.C. §112, ¶ 6. Moreover, even if the provisions of 35 U.S.C. §112, ¶ 6 are invoked to define the claimed disclosure, it is intended that the disclosure not be limited only to the specific structure, material or acts that are described in the preferred embodiments, but in addition, include any and all structures, materials or acts that perform the claimed function as described in alternative embodiments or forms of the invention, or that are well known present or later-developed, equivalent structures, material or acts for performing the claimed function.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

Implementations will hereinafter be described in conjunction with the appended drawings, where like designations denote like elements, and:

FIG. 1 is a first set time comparison table;
FIG. 2 is a second set time comparison table;
FIG. 5 is a cellulose ether reaction chart;
and
FIG. 6 is a cellulose bond diagram.

DESCRIPTION

Figures 3, 4:
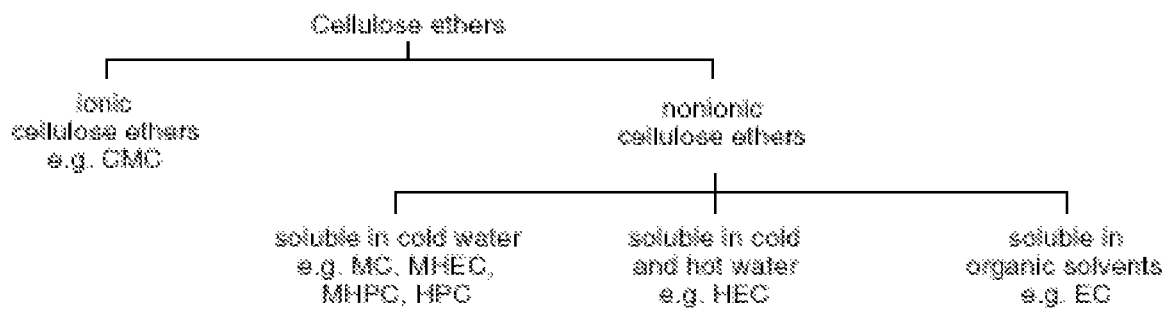
FIG. 3 is a cellulose ethers chart.
FIG. 4 is an alkyl group substitution table.

This disclosure, its aspects and implementations, are not limited to the specific components or mixing procedures disclosed herein. Many additional components and mixing procedures known in the art consistent with the intended cement mixture components and/or assembly procedures for cement components will become apparent for use with particular implementations from this disclosure. Accordingly, for example, although particular implementations are disclosed, such implementations and implementing components may comprise any shape, size, style, type, model, version, measurement, concentration, material, quantity, and/or the like as is known in the art for such cement mixtures and implementing components, consistent with the intended desired characteristics.

Additionally, in the following description, and for the purposes of explanation, numerous specific details are set forth in order to provide a thorough understanding of the various aspects of the disclosure. It will be understood, however, by those skilled in the relevant arts, that the present disclosure may be practiced without these specific details. In other instances, known structures, chemical compositions, mixtures and mixing components are shown or discussed more generally in order to avoid obscuring the disclosed implementations. In many cases, a description of the operation is sufficient to enable one to implement the various forms of the disclosure. It should be noted that there are many different and alternative configurations, devices and technologies to which the disclosed implementations may be applied. The full scope of the disclosure is not limited to the examples that are described below.

The total dosage weight of the set retardant added to the portland cement or other hydraulic cement in general and for particular implementations disclosed herein will vary for other implementations according to the needs of the applicator and the placement environment. Whether inter-ground with the portland cement or blended with the portland cement or other hydraulic cement, when particular additive implementations have been added thereto, as a part of the mixture pozzolan or combination of pozzolans and fillers, such as calcined kaolin, an ultra-fine fly ash, a fused silica, a metakaolin, or a vitreous calcium aluminosilicate, or a magnesium aluminum silicate, or a bentonite or a smectite, and with or without a cellulose ether derivative or its equivalent, the resulting pozzolan or filler-modified cement blend contains from about 65% to about 95% (w/w) of portland cement, from about 5% to about 35% (w/w) of pozzolan or pozzolan combinations or their functional equivalent, and from about 0% to about 2.0% cellulose ether derivative, and from about 0.01%-2% (w/w) zinc-based set retardant.

Set retardant mixtures are conventionally added at one or more of several times during a cement setting process, namely at the cement manufacturing plant as an "addition" (material, ingredient, or additive that is inter-ground or blended into a portland or hydraulic cement), at a ready-mix plant prior to shipment to a job site, pre-packaged or pre-blended with the cement package, and/or at a job site as an "admixture" (additive other than portland cement, water, sand, and/or aggregate, which is added to a cementitious product). As used herein, the term "set retardant additive" or "additive" is intended to specifically refer to a material, ingredient or mixture, other than portland cement, water, sand, and/or aggregate, which is added to a cementitious product either as an addition, pre-blended, pre-packaged, or as an admixture at any of the times when set retardant additive is conventionally added to a cement mixture.

Additions of a cellulose ether derivative or its functional equivalent aid in promoting the workability and in lowering the water to cementitious material ratio and, therefore, compliment the pozzolans and fillers in particular implementations. They have an inverse affect on the workability and the water to cementitious material ratio. In addition, using a small portion of the pozzolanic and filler ingredients that are of a slightly more coarse material further enhances workability. It has been found that for particular implementations if approximately 5% to 25% of the pozzolanic or filler portion are retaining on a 200 mesh (75 microns), while 90% to 95% of the remaining fraction passes the 325 mesh (45 microns), the workability of the resulting cementitious product is unexpectedly superior than if all ingredients were passing (finer than) the 325 mesh (45 microns).

Particular implementations also address the pre-preparation of any admixtures analogous to the inter-ground portland cement or the blended portland cement or the subsequent addition of a portland cement, whether in the dry mixing of the portland cement or the ready mixing of the portland cement, with water mixed together with a pozzolan or filler admixture to produce cementitious products. Such compositions may be used as, but are not limited to, concrete, plaster, precast, stucco, gunite, shotcrete, swimming pool finishes, rapid-set cement, oil well cement, and grout. The cementitious products and additives may be used in instances where cement products, as opposed to mortar or adhesive products, are needed such as, but not limited to, the construction of buildings, dams, bridges, roadways, slabs, pre-fabricated units, plugging oil well drill holes, airport runways, architectural casting, and swimming pools. Particular implementations may also be used with additional structural reinforcement such as, but is not limited to; rebar, expanded metal lath, woven-wire or welded-wire mesh, fiberglass mesh, fiberglass fiber, carbon fiber, and the like.

When the total weight of particular implementations of set retardant additives contain a mixture of pozzolans with or without fillers, or fillers with or without pozzolans, or their functional equivalent, and with or without a cellulose ether derivative or its equivalent, the resulting admixture preferably contains approximately: from about 60% (w/w) to about 80% (w/w) pozzolan(s), from about 20% (w/w) to about 40% (w/w) fillers, and from about 0.0% to about 2.0% (w/w) of a cellulose ether derivative, or its functional equivalent.

Particular set retardant additive implementations may contain "inert fillers" such as, but not limited to, fine powders of calcium carbonate, dolomite, talc, calcium bentonite, or functional equivalent, and/or larger sized inert fillers such as, but not limited to, sand or aggregate. However particular implementations of set retardant additives may also or alternatively include any larger inert material that is not a fine powder or sand or aggregate.

The inert filler in particular implementations may be used to produce a volume of material that more closely relates to a specific volume, weight, or mass, per bag or per batch volume needed or preferred by the mixer, the end user, or the producer, to reduce potential mis-proportioning in the field. Particular implementations of set retardant additives may be used in an industry where batching or mixing are often done by "rule of thumb", or according to long established custom.

Particular implementations of cement compositions and set retardant additives disclosed herein may have one or more of the following advantages over the current state-of-the-art:

1) Greater set control, or a more 'balanced' set, of cementitous materials from initial set to final set.

2) Greater control and efficiency in determining the extension of cement set time or delaying of cement hydration in the field.

3) Increased ability to control rheology and slump of cementitious material.

4) Decreased water migration, or 'bleed', resulting in a stronger finish surface, and therefore more durable product.

5) Increased pumping, placing, and workability characteristics over past invention.

6) Improved moisture retention allowing greater consistent of the fresh material and even curing of the hardened material.

7) Reduced autogenous and shrinkage cracking

8) Cementitious materials that are easier to place, work and finish over those without.

9) Set retardant additive that has increased compatibility to cementitious material and most other additives, whether organic or non-organic.

10) Lower heat of hydration.

11) Increased passivity to reinforcement.

12) Improved aesthetic appearance of the surface of the hardened cement.

Mixtures that mitigate negative affects of zinc salt anions of sulfate, chloride, and nitrate that would otherwise be deleterious to long-term durability.

The following examples are provided by way of non-limiting examples intended to explain specific particular implementations of cement compositions and set retardant additive compositions.

Example 1

According to a first particular implementation, initial testing was conducted in order to establish a practical upper limit (maximum) of the set retardant in a set retardant additive composition. Three test samples were made at 70° F. Control Sample Mixture #1 comprising 40% white cement and 60% marble sand (w/w) and having a 0.51:1 water to cement material ratio (w/w), which was enough water to create a mixture having a workable consistency to that normally used in a plaster application. Two other sample mixtures were made, comprising similar ratios of cement and sand to that of Control Sample Mixture #1, but were modified, each sample comprising 2% zinc oxide (as set retardant) to cement (w/w) of a different natural-occurring crystalline structure. Set Retardant Sample Mixture #2 comprising 2% acicular zinc oxide powder and Set Retardant Sample Mixture #3 comprising 2% spherical or globular zinc oxide powder. Both types of zinc oxide set retardant were in powder form consisting of a minimum of 99% purity zinc oxide and of a fineness whereby 99% was passing 325 mesh (45 micron). Set Retardant Sample Mixture #2 and Set Retardant Sample Mixture #3 needed only a 0.46:1 water to cement materials ratio (w/w) in order to have the same workability characteristics as the Control Sample Mixture #1 having a 0.51 water to cement ratio. (See the Table provided in FIG. 1). Surprisingly, even at a high 2% zinc oxide concentration, workability and rheology characteristics remained similar to the control sample. This is not normally the case with set retardants. Moreover, workability and rheology characteristics generally tend to suffer as the set retardant concentration increases in relation to the cementitious materials.

This example indicates that for ranges of zinc oxide as a set retardant up to a 2% ratio to cement (w/w), similar plasticity, workability, slump, and flow characteristics are maintained in relation to those found in the non-modified Control Sample Mixture 1. This example also indicates a reduced water demand. The zinc oxide of Set Retardant Sample Mixture #2 was chosen as the superior type of zinc oxide, as it bestowed a greater control of set, and a slightly more beneficial increase in the workability and rheology characteristics.

In particular implementations of the cementitious materials compositions and set retardant compositions disclosed, the pozzolans offer an ability to react with portland cement's weakest compound, calcium hydroxide, forming a stronger calcium silica hydrate compound, thereby rendering the cementitious product more durable than otherwise possible. Other benefits may include the stabilization of the soluble anions of zinc sulfate, zinc chloride, and zinc nitrate, optimized rheology, increased workability, and reduced efflorescence. Reduced efflorescence, in turn, aids in holding fast color pigments by limiting salt migration. Though several pozzolan combinations would be acceptable for use with the particular implementations of zinc-based set retardant additives, the chosen pozzolans for particular implementations are vitreous calcium aluminosilicate, magnesium aluminum silicate (smectite clay), and silica fume in combination.

When the set retardant of the present invention is added in combination with the cellulosic polymer of the present and the pozzolans of the present invention, along with the portland cement or hydraulic cement and sand/aggregate/filler, the resulting cementitious-based material has the unexpected value as bestowing ease of pumping, placement, and finishing, while simultaneously lessening the segregation of the sand/aggregate/filler, lessening sagging, limiting water demand, and moderating or balancing the hydration and speed of reaction of the material from initial set to final set. Many of these characteristics have been generally considered to be mutually exclusive of one another.

The timing of the addition of the set retardant components is included in this invention. As described earlier, it is not uncommon for additives to be added at the cement plant, or the ready mix plant, or to be pre-blended or pre-packaged, or to be introduced at the job site, and will bestow the same beneficial properties to the cementitious product. This is equally true with the set retardant additive implementations disclosed herein. Different from conventional single-component set retardant additives, however, the potential plurality of components herein may be introduced at any of the above stages and bestow the same net benefits, regardless of the timing of their inclusion during the process. For example, the addition of a certain cellulosic derivative for a particular implementation may allow greater rheology to be attained and lessen segregation of the sand/aggregate/filler within the cementitious material during pumping or placement of a freshly-mixed cementitious material. The addition of a certain pozzolan(s) of particular implementations is beneficial to reduce bleed water, retain moisture, increase slump, and provide long-term durability to a cementitious material. These components, and zinc component, may be added together, or at different stages prior to mixing the material with water, yet the resulting benefit is the same, and therefore contemplated by this disclosure.

It is theorized that the addition of zinc-based additives, such as zinc-oxide based additives, bestows two additional advantages upon cement products comprising zinc-based set retardant additives. The zinc portion of particular implementations may become available after final set of the concrete to migrate through solution and provide cathodic protection (or passivity) to steel reinforcement. Additionally, the zinc portion of particular implementations may become available to provide antibacterial or fungicidal properties to the set concrete structure.

The research associated with the present set retardant additives was extensive and identified particular combinations and implementations that result in a more controllable cement set time as well as improved material characteristics that enable significantly greater mixing, pumping, placing, working and finishing of the cementitious material. Implementations of set retardant additives used herein are accomplished without synthetic, oil-based, carbon-based, or polymeric mixtures. The particular formulations of the ingredients in particular implementations compliment the unique properties of each ingredient, and compliment the ingredients to one to another, so that the total composition when introduced to the cementitious materials promotes an unexpected plurality of beneficial characteristics.

This is significant because synthetic, oil-based, carbon-based, or polymeric mixtures, such as: citric acid, sodium citrate, ammonium citrate, sodium gluconate, borax, tannic acid, salts of boric acid, tartaric acid, sucrose and other polysaccharides, salts of phosphoric, poly phosphoric, or phosphonic acid, retard cement by molecularly absorbing onto, or coating, and otherwise 'blocking' water from reacting with the portland cement or hydraulic cement particles. Such set retardants are undesirable.

Other set retardants of a second type chelate, or sequester, 'block', or 'bind up' the calcium hydroxide (or more accurately the calcium ions) necessary to establish chemical and electro-chemical equilibrium for cement reaction and hydration to proceed. These mechanisms effectively "block" or "bind up" either crucial hydration water from penetration into cement particles, or crucial calcium ions from establishing its normal equilibrium within the cement; and therefore, inhibit normal hydration of cement particles. There is little, if any, control over these chemical 'blocking' mechanisms, in terms of manipulating at what point (when), or at what speed, these blocking mechanism will either sufficiently diffuse, or release calcium ions, and allow further cement hydration to proceed. Therefore, it is not easy to control these set retardants with a degree of accuracy.

Set retardants of the second type are based on chelating the calcium hydroxide compound (calcium ions) released from cement hydration, such as polyacrylate or polyacrylamide, hydroxylcarboxylic acid salts, lignosulfates or lignosulphonic acid salts, and certain hydroxylated polymers, with or without sulphonated naphthalene or melamine-formaldehyde condensates or polycarboxylates. Chelating calcium hydroxide, of calcium ions, alters the pH and alkalinity of the cementitious-based material and inhibits hydration of certain cement compounds.

Set retardants of the first type, are based simply on molecularly 'coating' the cement particles (in essence, like a coating of oil) that affectively inhibit water (moisture) from reaching the cement to react. Moreover, some conventional set retardants create interference to the normal hydration of cement, that are over-powering to the system and unpredictable, very finicky by nature, and difficult to micro-manage effectively. Basically, their mechanism of set retarding is 'too effective', due to their incompatibly strong (organic) synthetic nature versus the more moderate (inorganic) nature of Portland cement and hydraulic cements. Even in very small amounts, they can cause severe delay to the hydration reaction of cement, they are temperature sensitive, and cannot easily be controlled by technicians during application, from initial set to final set. Predictability in set times is very desirable for cement pouring. Unpredictability can be disastrous.

Finally, the chelating, 'binding up', or sequestering of calcium ions of the cement, and/or the coating, affectively 'waterproofing' or blocking of hydration water (moisture) from the cement particles, is not manageable or controllable as to when it initiates, dissipates, and ceases between initial set and final set. In other words, these mechanisms are extremely fragile, they can cause undesirable characteristics to the cementitious material early on, such as: increased slump, increased bleed water, and potentially irreversible "kill" of the set. Additionally, later on they can also cause skinning, an increased speed-of-set, or more rapid setting.

Particular implementations disclosed herein overcomes these obstacles by retarding the set of cement through manipulation, and not prevention, of the chemical and electro-chemical equilibriums normally established within the cementitious material upon mixing with water. The zinc portion of particular implementations, when used as a retardant, effectively, but temporarily, enters into substitution reactions, based on the quantity of zinc matter added. Zinc ions combine with the calcium hydroxide compound of cement (present as calcium ions and hydroxyl ions) liberated during the ongoing hydration of cement. Zinc ions can also preferentially enter into temporary metastable reactions with other cement compounds that would normally have entered reaction with calcium ions. The impedance of the normal ongoing reactions creates a delay in the set time of the hydraulic cement compounds. The calcium ions control the pH and alkalinity of the cement and regulate, to a large extent, the hydration reaction, and therefore, the set time. The significance of this reaction, whereby zinc ions temporarily create a fixation of calcium hydroxide of the cement (or in its ionized form) to form a temporary insoluble complex salt compound (believed by the inventor to be calcium hydroxyl zincate), alters the normal equilibrium of the cement by chemically combining with cement hydration components, and not by 'blocking' or 'chelating' hydration or hydration components. This slows the hydration of the cement. It is further hypothesized that some additional retardation at initial set may be due to zinc passivating the surface of the tricalcium aluminate compound of the cement. This passivating is overcome as hydration continues from initial set to final set, allowing level or 'even' continued hydration, and a more controllable and workable material.

Although the aforementioned mechanisms are still being investigated, and it may be determined that similar compounds or other temporary pseudo-stable species are formed than those hypothesized herein, the fact of achieving superior control of set and superior placing, working, finishing and durability remains. The chemical and electro-chemical reactions of the zinc of particular implementations disclosed herein with their particular compositions and relative ratios and the calcium ions of the cement occur in concert, as co-chemical diffusion and/or co-chemical migration of 'like' species, and as an organic zinc matter with organic cement compounds. Conventional set retardants involve reactions to the cement compounds, meaning there is "blocking" of hydration water from the cement particles, preventing them from entering reaction, or by chelating, sequestering, or "locking up" calcium ions, preventing them from entering reaction. Implementations of the set retardant additives disclosed involve an inorganic, or non-synthetic additive which is, therefore, compatible to cement. Additionally, because these reactions are ongoing moderate chemical and electro-chemical reactions, they proceed orderly from initial set to final set in a manner and not so over-powering to the cement's normal hydration. This means that they can be more easily controlled and predicted for creating expected characteristics needed for proper placing and finishing between initial set and final set.

Though several zinc-based materials are acceptable for use as the present inventions set retardant, such as, zinc chloride, zinc hydroxide, zinc carbonate, and zinc nitrate, it was a zinc oxide, in powder form, that was chosen for the particular examples, as it bestowed the optimum properties needed for the set retardant while maintaining other valued characteristics of cement, including, but not limited to, a level or even control-of-set from initial set to final set, compatibility to limit the normally-expected losses to the workability and rheology characteristics of cement, a 'moderate' reactivity of the set retardant matter, its compatibility with other polymers and pozzolans additions, additives, and admixtures.

Zinc oxide mineral is preferred over zinc salts, such as zinc chloride, zinc sulfate, zinc nitrate, and the like, because the anion of these compounds can cause adverse affects to the cementitious materials. Chlorides and nitrates are known to accelerate set times and cause an increased corrosion rate to metal reinforcement and lower compressive strengths. Sulfates are known to cause deleterious expansion to cementitious materials over time. Therefore, such zinc salts are not preferred, or if used, must be accompanied by specific pozzolans of sufficient ability and quantity to 'bind up', or immobilize, the accompanying zinc anion, and thereby mitigate its' potential destructive ability and ensure the overall durability or longevity of the end product is preserved. Several examples disclosed herein include such pozzolans in appropriate quantities to accomplish this for zinc salts. The inclusion of an optimized novel pozzolan combination, which enables the usage of these salts, without reducing overall durability or service life expectancy of the end product, is further disclosed herein.

When particular implementations are produced or manufactured as a pozzolan-modified, inter-ground, or blended hydraulic cement comprising portland cement or other hydraulic cement, a silica fume, a magnesium aluminum silicate (smectite) clay, a vitreous calcium aluminosilicate, and a cellulose ether derivative as described herein, one particular implementation comprises this particular formulation: from about 65% to about 88% (w/w) portland cement; from about from 0.01% to about 2% zinc oxide (w/w); from about 2% to about 15% (w/w) silica fume, or its functional equivalent; from about 2% to about 27% (w/w) vitreous calcium aluminosilicate; from about 1% to about 15% (w/w) calcium carbonate or dolomite fine filler; and from about 0% to about 2.0% (w/w) cellulose ether derivative or its functional equivalent, weight percentages (w/w) being taken relative to the total weight of the dry cementitious materials. The additional materials added to the portland cement may be pre-mixed as an additive with the cement prior to delivery to the job site or added as an admixture at the job site or an additive during any time of the cement process.

Where sufficient water reducing capacity is already present by attribute of the three pozzolanic ingredients, no addition of the cellulose ether derivative may be needed. If an insufficient water reducing capacity of the mixture is present, or if an increase in slump, or a decrease in proper rheology are present, then the cellulose ether derivative or its functional equivalent, may be added to the mixture to insure the resulting cementitious material contains the optimum amount water reducing capability that the specific end-user needs or desires. Those of ordinary skill in the art will readily understand this application and how to adjust for particular regions and climates and situations based on this disclosure. The zinc-based set retardant and cellulose ether derivative, or its functional equivalent need not be added at this stage in the process. It only need be added at some point in the process so as to be component of the final mix design of the cementitious material.

When particular implementations are produced or pre-blended as an additive or admixture for subsequent use with portland cement or other hydraulic cement, the additive or admixture comprises a silica fume, a magnesium aluminum silicate (smectite) clay, a vitreous calcium aluminosilicate, and a cellulose ether derivative as described herein, with or without the addition of sand, aggregate, or other inert materials, one particular implementation comprises this particular formulation: from about 0.01% to about 2% (w/w) zinc-based set retardant; from about 2% to about 15% (w/w) silica fume, or its functional equivalent; from about 2% to about 27% (w/w) vitreous calcium aluminosilicate; from about 1% to about 15% (w/w) calcium carbonate or dolomite fine filler; and from about 0.01% to about 2.0% (w/w) cellulose ether derivative or its functional equivalent, weight percentages (w/w) being taken relative to the total weight of the dry cementitious materials. As with the previous implementation, where sufficient water reducing capacity is already present by attribute of the three pozzolanic ingredients, no addition of the cellulose ether derivative may be needed. If an insufficient water reducing capacity of the mixture is present, or if an increase in slump, or a decrease in proper rheology are present, then the cellulose ether derivative or its functional equivalent, may be added to the mixture to insure the resulting cementitious material contains the optimum amount water reducing capability that the specific end-user needs or desires. The zinc-based set retardant need not be added at this stage in the process; it only need be added at some point in the process so as to be a component of the final mix design of the cementitious material.

The various implementations of a set retardant additive disclosed herein are analogous to the modified, inter-ground, blended hydraulic cement, or other hydraulic cement of the present invention in that the admixture contains no hydraulic cement, but does contain the same selection of the other ingredients in relative proportions analogous to those stipulated for the corresponding modified, inter-ground, blended hydraulic cement or other hydraulic cement. The disclosure contemplates a ready-mixed or a wet mixture cementitious product, with the inclusion of sand and/or aggregate, and water that is mixed with either a pozzolanic admixture and portland cement or with a pozzolan-modified portland cement.

The scope of this disclosure includes any cementitious material that is produced, manufactured, mixed, or blended, using individual components that, when combined, create the formula of any particular implementation. The scope of this disclosure also includes any cementitious material that is produced, manufactured, mixed, or blended, using various combinations of ingredients that, when combined, create the formula of any particular implementation. The scope of this disclosure further includes any cementitious product that may require the use of fillers, set modifiers, water, sand, and/or aggregate, or other ingredients that are typically necessary to create certain precast, concrete, plaster, or other cementitious products in addition to said invention's formula in order to make the final novel pozzolanic cementitious product.

When particular implementations are produced, manufactured, blended, or packaged, as an additive or admixture to be added to portland cement or other hydraulic cement, with or without sand and aggregate, with or without inert filler material, with or without polymers, with or without pozzolans, comprising only a zinc-based matter, the zinc-based matter in particular implementations ranges from about 0.01% to about 2% (w/w) of the portland cement or other hydraulic cement. In particular implementations, the zinc-based matter ranges from about 0.01% to about 1% (w/w) of the portland cement or other hydraulic cement. However, the zinc-based set retardant additives may be added at any stage of the process. It need only be added at some point in the process so as to be component of the final mix design of the cementitious material.

The fused silica of this invention equivalent must display a highly pozzolanic reactive, capable of reacting chemically with the calcium hydroxide compound of portland cement. The pozzolanic reactivity should be shown by compression strength comparison testing, whereby hardened cementitious products, one with and one without the amorphous silica are tested. The amorphous silica product should be found to exhibit equal or greater compression strength at 28 days to that of the product having only portland cement.

Example 2

Testing was conducted to determine minimum and optimum dosage levels using the same zinc oxide set retardant chosen in Set Retardant Mixture #2 from Example 1. A Control Sample Mixture comprising 40% white cement and 60% marble sand (w/w) and having a 0.51:1 water:cement material ratio (w/w), which was enough water to create a mixture having a workable consistency to that normally used in a plaster application. Many other sample mixtures were made (See the table of FIG. 2), comprising similar ratios of cement and sand to that of the Control Sample Mixture, but were modified, each sample having varying amount of the zinc oxide set retardant. The zinc oxide set retardant was in powder form consisting of a minimum of 99% purity zinc oxide and of a fineness whereby 99% was passing 325 mesh (45 micron). The samples were thoroughly mixed with water and immediately placed under heat lamps, where temperatures were maintained between 100° F.-120° F. from initial to final set for all samples. The samples were made in like manner and consistency as is common to the plastering trade, and were troweled periodically and tested to establish workability characteristics considered beneficial to the trade, as well as establishing set retardant ability, based on dosage rate versus time from initial set to final set. The comparison results were based on the zinc set retardant dosage rate as a percentage of the cement materials of these tests are reported in the table of FIG. 2.

It is further shown in FIGS. 1 and 2 the significance of the particular implementations of the set retardant additives. The 2% range (w/w cement) at which significantly high set retardation can be achieved, and the 0.01% range, (w/w cement) at which a minimal set retardation can be achieved, and an optimal range between 0.01% to less than 0.2%. Also, a surprising order-of-magnitude relationship is found between slight increases in the dosage rate bestowing incrementally larger increases in set times. The minimum/maximum dosage ranges being 0.01% (w/w cement) and 2.0% (w/w cement) respectively, and the optimum range determined in the field of practice, and based on the many factors that each individual job requires to maintain set times and workability long enough to properly finish the cementitious product. The end user can now more predictably retard the cement setting in the field where previously it was not predictable.

In particular implementations of the cementitious materials compositions and set retardant compositions disclosed, the pozzolans offer an ability to react with portland cement's weakest compound, calcium hydroxide, forming a stronger calcium silica hydrate compound, thereby rendering the cementitious product more durable than otherwise possible. Other benefits may include the stabilization of the soluble anions of zinc sulfate, zinc chloride, and zinc nitrate, optimized rheology, increased workability, and reduced efflorescence. Reduced efflorescence, in turn, aids in holding fast color pigments by limiting salt migration. Though several pozzolan combinations would be acceptable for use with the particular implementations of zinc-based set retardant additives, the chosen pozzolans for particular implementations are vitreous calcium aluminosilicate, magnesium aluminum silicate (smectite clay), and silica fume in combination.

In particular implementations of the cementitious materials compositions and set retardant compositions disclosed, a cellulose polymer may be added. In particular implementations, the cellulose polymer may comprise a polysaccharide which is a long chain polymer linked through a 1.4 glycosidic bond with repeating 6-member ringed units of glucose, or a simple sugar, whereby hydrogen atoms are removed from the hydroxyl groups of the anhydroglucose rings in the linkage and are replaced with a glycidyl alkyl group and/or other substitution alkyl group, thus forming a high-molecular-weight cellulose ether compound. Anhydroglucose units are formed when the glucose units of the cellulose polymer are combined with an alcohol, whereby a molecule of water is lost in the reaction. The chemical reactivity and physical properties of cellulose ether derivatives can very greatly depending on the degree of polymerization. The degree of polymerization is determined by the molecular and structural properties of the cellulose as well as the degree of molar substitution, and the molar substitution. The degree of substitution (DS) is the number of hydroxyl group substitutes per anhydroglucose unit along the polymer chain. The degree of molar substitution (MS) is the substitution ratio of alkoxy groups to cellulose at the side chains. In particular implementations, the cellulose ether may be modified by the addition of the glycidyl alkyl group or other substituted alkyl group such as alkylhydroxyalkyl ether, hydroxyalkyl ether, and carboxyalkyl ether, which determines to a large extent the reactivity of the remaining hydroxyl groups.

The (DS) is a number from 1 to 3 representing the three hydroxyl groups on the anhydroglucose rings along the polymer chain, which are potentially available for substitution. Generally, partial reactions where (DS) is less than 3 inhibits co-polymerization, whereby the hydroxyl group tend react in a less ordered, more random fashion leaving the remaining hydroxyl group(s) non-reactive. Higher degrees of substitution cause reactions to occur more frequently along the chain thereby disrupting the crystalline regions and forcing the ringed units apart. Therefore, manipulation of the degree of substitution (DS) determines to a large extent if the cellulose will be hydrophilic (absorb water) or hydrophobic (repel water), sticky or workable (workable), or whether the cellulose will be weak or strong hygroscopically (water retention).

The (MS) is a molecular substitution ratio of the alkoxy groups or substituted alkyl groups, in relation to that of the cellulose of the polymer, and is usually stated as a weight percent. The alkoxy groups are determined to a large extent by knowing the needs of the intended market for the cellulosic material as shown in the examples of FIGS. 3 and 4. Substitutions can be made by using the table shown in FIG. 4.

The cellulose ether of particular implementations of a set retardant additive is a polysaccharide composed of individual anhydroglucose units linked through a 1.4 glycosidic bond (FIGS. 5 and 6) having "n" number of anhydroglucose units in the polymer chain, which determine the degree of polymerization. Each anhydroglucose ring carries three OH-groups at positions 2, 3 and 6, which are chemically active. The preferred alkoxy group substitution is hydroxyethyl introduced onto the polymer chain, which determines to a large extent the relative reactivity of these three OH— groups as well as many physical characteristics the cellulose polymer will have.

Though several cellulosics, such as methyl cellulose or hydroxyethyl cellulose, or several natural polysaccharide gums, such as xantham gum, would be acceptable for use with the various implementations of zinc-based set retardant additives, a hydroxyethylcellulose was chosen for particular examples, as it bestowed the optimum properties needed to compliment the zinc-based set retardant.

Example 3

A pozzolan-modified portland cement was prepared by the grinding the clinker of a portland cement, with a gypsum or a hemi-hydrate form of gypsum, and with a particular implementation of a set retardant additive disclosed herein, with and without a pozzolan. Clinker, as described herein, is the cement material that is created after the kilning process, but prior to the grinding process. The clinker material, the gypsum material, and the pozzolanic admixture were thoroughly ground together to create a composition containing approximately 75% (w/w) of portland cement; 20% (w/w) of calcined kaolin; 10% (w/w) of ultra-fine fly ash; 5% (w/w) of fused silica; 0.12% (w/w) zinc oxide; and 0.5% (w/w) hydroxyethylcellulose, weight percentages (w/w) were blended into this pozzolan-modified cement after the grinding process, and not during the grinding process.

An exemplary use of this mixture would be for a shotcrete product that is prepared by mixing the pozzolan-modified portland cement as prepared in this example above, with water, sand, and ⅜" gravel, having a 1:2:4 ratio of a cement: sand:gravel mix design and sufficient supplemental water added to give the shotcrete the desired workable consistency.

Example 4

A pre-blended pozzolan-modified additive implementation was prepared by thoroughly blending together a particular implementation of a set retardant additive disclosed herein. The Portland or other hydraulic cement is then combined with the additive, and blended together to create a composition that was containing approximately 70% (w/w) of portland cement or other hydraulic cement; 12% (w/w) of calcined kaolin; 12% (w/w) of ultra-fine fly ash; 6% (w/w) of fused silica; 0.12% (w/w) zinc-based material such as zinc-oxide or a zinc salt; and 0.5% (w/w) hydroxyethylcellulose as a total weight percentages (w/w).

An exemplary use of this mixture would be for a concrete slab or walkway that is prepared by mixing the pozzolan-modified blended portland cement as prepared in this example above, with water, sand, and aggregate, having a 1:2:4 ratio of a cement:sand:aggregate mix design and having sufficient water added to allow the concrete to be properly placed.

Example 5

First, an additive from a particular implementation was prepared using only the set retardant acicular zinc oxide. The additive in powder form consisting of a minimum of 99% purity of an acicular zinc oxide having a fineness whereby 99% passing 325 mesh (45 micron). The additive was blended into the cement through intergrinding at the cement plant. Second, an admixture was prepared using the same described retardant, which was pre-blended by paddle mixer at a separate facility and subsequently added in at a job site, to a mixer drum and blended together with cement, sand, and water to make a plaster material.

An exemplary use of this additive and admixture would be for its subsequent addition to create a modified slow setting cementitious product. The modified set retardant cementitious product of this example can be prepared by mixing the admixture as prepared in this example above as a ready mix, or as a wet mix in a paddle mixer. As a cementitious material addition or additive, the mix design consists of a range from 0.01% to 2.0% (w/w) to that of the entire mix design, including aggregate. In a particular implementation, the mix design consists of a range from 0.01% to 1% (w/w) of zinc-based material to that of the entire mix design, including aggregate. The modified cementitious material can be used to make many cementitious products, such as precast and ornamental concrete, gunite, plaster, concrete, roadways, walkways, airport runways, bridges, and the like.

Example 6

For a particular implementation, a plaster was prepared by mixing simultaneously: 39% portland cement (w/w); 54.95% sand (w/w); 0.03% zinc-based set retardant (w/w); 2% silica fume (w/w), 3% vitreous calcium aluminosilicate (w/w); 1% calcium carbonate fines; or 0.2% (w/w) hydroxylethyl cellulose, weight percentages (w/w) being taken relative to the total weight of the material. Water was then added to the mixture in sufficient quantity to allow the plaster to have the desired workable consistency. A strong cementitious mixture was obtained having excellent set retarding qualities, whereby 45 minutes of additional setting time set was realized in the field while placing the plaster, during a day having average 105° F. temperature during application, while still maintaining excellent pumping, placing, working, and finishing characteristics.

Inert fillers or bulking agents used in particular implementations are fine powders of inert ingredients that may increase the paste or "creme" of the cementitious products. In particular implementations, the desired range of fineness is that of passing a 200 mesh (75 micron) to a 325 mesh (45 micron) or finer. Compositions such as talc, calcium bentonite, lime, calcium carbonate, dolomite, or clay, are typically used.

In particular implementations of the cementitious materials compositions and set retardant compositions disclosed, the chosen fillers, such as sand and aggregate, are important insomuch as they provide additional densification to the cementitious matrix, which in turn provides higher compressive strength and a reduction in permeability. Certain inert fillers may be chosen for optimizing certain beneficial characteristics to the cementitious-based material, such as, without limitation, reduced autogenous shrinkage, reduced slump, optimized rheology, and increased workability. The chosen filler for particular examples provided herein was marble fines, due to their ability to absorb moisture, reduce slump, increase workability, and their non-carcinogenic by nature.

The implementations listed here, and many others, will become readily apparent from this disclosure. From this, those of ordinary skill in the art will readily understand the versatility with which this disclosure may be applied.

In places where the description above refers to particular implementations of frequency reference generating systems and methods, it should be readily apparent that a number of modifications may be made without departing from the spirit thereof and that these implementations may be applied to other telecommunication and frequency reference code generating implementations.

The invention claimed is:

1. A set retarder for hydraulic cement achieving a set time of between 2 to 5 hours, the set retarder comprising about 0.01 wt % to about 2.0 wt % zinc oxide;
   about 5 wt % to about 45 wt % of one or more pozzolans; and about 0.01 wt % to about 2 wt % cellulosic polymer.

2. The set retarder of claim 1, wherein the zinc oxide comprises about 0.01 wt % to about 0.25 wt %.

3. The set retardant additive retarder of claim 1, wherein the first amount of zinc oxide comprises acicular zinc oxide powder.

4. The additive retarder of claim 1, wherein the first amount of zinc oxide comprises spherical or globular zinc oxide powder.

5. The set retarder of claim 1, wherein the set retarder is added to cement at a temperature of between about 70° F. and about 120° F.

6. The set retarder of claim 1, wherein for an hydraulic cement mixture comprising about 40 wt % of white cement and about 60 wt % of marble sand prior to addition of the set retarder, the zinc oxide comprising at least 95% of zinc oxide powder smaller than about 325 mesh (45 micron).

7. The set retarder of claim 1, wherein the at least 95% of the zinc oxide is ground at least to a fineness of at least 200 mesh (75 micron).

8. The set retarder of claim 1, wherein the zinc oxide comprises an acicular zinc oxide powder containing at least about 95% of zinc oxide ground sufficiently so that about the powder passes 325 mesh (45 micron).

9. The set retarder of claim 1, wherein the pozzolan comprises at least one of silica fume, fly ash, calcined kaolin and vitreous calcium aluminosilicate.

10. The set retarder of claim 1, wherein the pozzolan comprises about 0 wt % to about 30 wt % silica fume, about 0 wt % to about 45 wt % fly ash and about 0 wt % to about 40 wt % vitreous calcium aluminosilicate.

11. The set retarder of claim 10, wherein the fly ash comprises about 3 wt % to about 27 wt %.

12. The set retarder of claim 11, wherein the silica fume comprises about 1 wt % to about 15 wt %.

13. The set retarder of claim 12, wherein the calcined kaolin or vitreous calcium aluminosilicate comprises about 5 wt % to about 27 wt %.

14. The set retarder of claim 1, wherein the retarder is used in concrete, gunnite, and plaster.

15. The set retarder of claim 1, wherein the retarder is used for cement for the construction of structures exposed to water, heat, and pressure.

16. The set retarder of claim 1, wherein the retarder is used in cement for the construction of bridges, piers, damns, freeways, and airport runways.

17. The set retarder of claim 1, wherein the set time is between about three to about four hours.

* * * * *